March 8, 1966 F. D. FREDA 3,239,146
FLOCKING APPARATUS
Filed Dec. 13, 1963 2 Sheets-Sheet 1
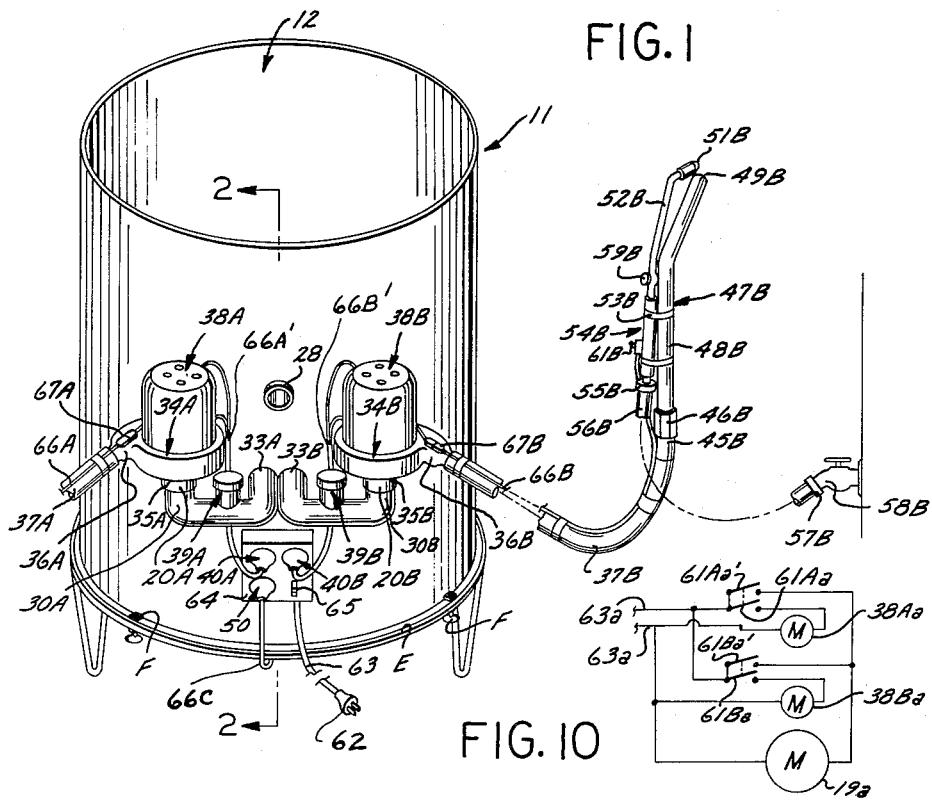
FIG. 1
FIG. 10
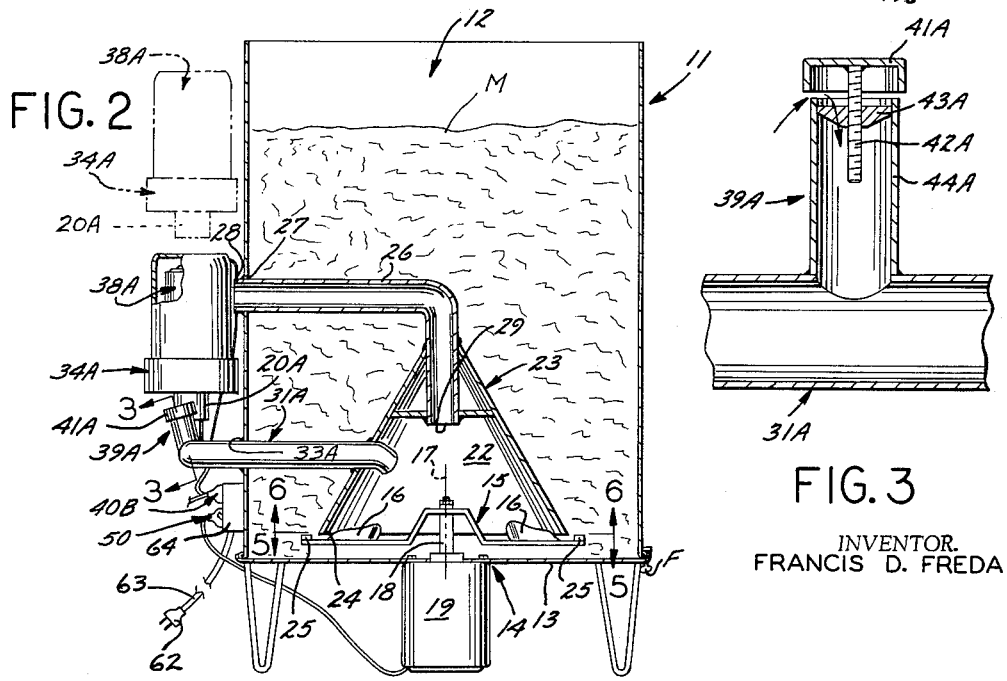
FIG. 2
FIG. 3
INVENTOR.
FRANCIS D. FREDA March 8, 1966 F. D. FREDA 3,239,146
FLOCKING APPARATUS
Filed Dec. 13, 1963 2 Sheets-Sheet 2

INVENTOR.
FRANCIS D. FREDA 3,239,146
FLOCKING APPARATUS
Francis D. Freda, 1522 N. Boylston St.,
Los Angeles, Calif.
Filed Dec. 13, 1963, Ser. No. 330,398
13 Claims. (Cl. 239—142)

Generally speaking, the present invention relates to apparatus for applying finely divided material to any surface and, more particularly, pertains to flocking apparatus for feeding and spraying finely divided flock material and water on a surface to which the flock is to be applied and can be caused to adhere. The so-called flock material may comprise any of several different types of finely divided particulate material, some of which is made from plastic and some of which is made from wood by-products or various mineral materials (although this is not to be construed as specifically so limiting the invention) and usually the particles are either of an inherently self-adhesive nature when wet by water so that they will automatically adhere to the surface upon which the flock material and water mixture is sprayed, or are provided with an exterior adhesive coating adapted to be activated in the presence of water.

One form of such flock material is used for spraying conventional green Christmas trees, such as Douglas firs, balsam firs, or any other suitable trees, so as to effectively cover the tree with a coating which is usually white in appearance whereby to simulate snow, although in certain cases it is colored so as to have any desired appearance. This is merely illustrative of one type of flocking and is not to be construed as specifically limiting the invention thereto.

With the above points in mind, it is an object of the present invention to provide a novel applicatory apparatus for forcibly spraying a finely divided material into a selected region and which comprises supply hopper means adapted to receive a quantity of finely divided material and which is further provided with rotary agitating and feeding means positioned within the supply hopper means adjacent to the bottom thereof and covered by protective baffle and cover means which prevents the finely divided material from dropping directly onto the rotary agitating and feeding means in a manner which might stall same and which is positioned above said rotary agitating and feeding means in a manner such that quantities of said finely divided material which pass downwardly on the outside of said baffle and cover means may be received by said rotary agitating and feeding means and thrown upwardly into the interior thereof and may there be received by pneumatic feed means and fed through outflow duct means, under the action of pumping means, toward an outflow terminus which may be provided with suitable spray nozzle means in certain forms of the invention.

The arrangement is such that the finely divided material is prevented from stalling the rotary agitating and feeding means and is prevented from choking the pneumatic feed means so that the device will continue to operate and feed the finely divided material toward said outflow terminus of said outflow duct means with virtually no likelihood of stalling as a result of temporary overloading and it will do this with relatively small power consumption for motor means which operate said rotary agitating and feeding means and said pump means.

It is a further object of the present invention to provide apparatus of the character set forth in the preceding object, wherein the finely divided material thrown upwardly by said rotary agitating and feeding means into said protective baffle and cover means, is thrown tangentially and upwardly in a direction substantially opposite to the inflow direction of air and said finely divided material, when sucked by said pneumatic feed means into said outflow duct means, under the action of said pump or blower means, thus preventing the direct throwing of said material into said inflow portions of said outflow duct means and thus eliminating the possibility of choking same whereby to impede the free flow of air and flock material therethrough.

It is a further object of the present invention to provide apparatus of the character referred to hereinbefore, wherein the rotary agitating and feeding means includes rotor means for tangentially upwardly throwing the finely divided material, as referred to hereinbefore, and wherein said rotor means is provided with stirring or mixing means positioned radially outwardly of the protective baffle and cover means and adapted to stir and mix the finely divided material positioned outwardly thereof and extending upwardly thereabove whereby to effectively facilitate gravity-caused downward feeding of said finely divided material in said annular or peripheral region positioned outwardly of the plan view area of said protective baffle and cover means; said downwardly fed finely divided material filling the volume previously occupied by the finely divided material thrown tangentially upwardly as a result of forward rotation of the rotor means. This feature facilitates the non-jamming aspect of the present invention and provides a positive and non-choking feed at all times.

It should also be noted that the pneumatic feed means is provided with controllably openable air bypass means in parallel with the portion thereof connected to the interior of said protective baffle and cover means whereby to effectively control the degree of suction applied thereto and, therefore, the quantity of said finely divided material fed outwardly through said outflow duct means to said outflow duct terminus.

It is a further object of the present invention to provide apparatus of the character referred to in the preceding object, wherein the apparatus is particularly designed to feed finely divided material, comprising self-adhesive flock material, and wherein the outflow terminus is spaced some distance from the supply hopper means and the rotary agitating and feeding means thereof and is connected with respect to said protective baffle and cover means by an interconnecting extension duct comprising an extension of said outflow duct means, such as a flexible hose or the like, and wherein the remote outflow terminus is provided with dissemination nozzle means and with closely adjacent water spray nozzle means convergingly directed for causing convergence of water spray and flock and air mixture as they are forcibly ejected from the corresponding nozzle means.

It is a further object of the present invention to provide apparatus of the character set forth in the preceding object, wherein said water spray nozzle means is provided with controllably openable and closable valve means for controlling the emission of said water spray, and whereby said dissemination nozzle means is effectively provided with control switch means for controlling the operation of said pump means whereby to control the feed of the flock material and air flow carrying same through said dissemination nozzle means.

It is a further object of the present invention to provide a pair of said outflow duct means, pump or blower means, extension ducts, outflow terminuses and dissemination nozzle means, each provided with its own one of said closely adjacent water spray nozzle means convergingly directed for causing convergence of water spray and flock and air mixture as they are forcibly ejected from said corresponding nozzle means. In this form of the invention, each paired nozzle set is provided with its own water-flow-controlling valve means and its own electrical control switch for controlling the operation of the corresponding pump or blower of the corresponding pneumatic feed means.

It is a further object of the present invention to provide apparatus of the character referred to in the preceding object, wherein each of said switch means is connected in parallel with the other one of said switch means; wherein the electric motor of each of said air pump or blower means of each of said pneumatic feed means is electrically connected in parallel with the other one and in series with the corresponding one of said control switch means, and wherein each of said control switch means and blower motors is connected in series with a main motor drivingly coupled with respect to said rotary agitating and feeding means, whereby to provide an arrangement such that said rotary agitating and feeding means will continue to operate as long as either pneumatic feed means continues to operate under the control of a person who has closed one or the other of said control switch means carried by one or the other paired set of nozzle means. Of course, the same type of operation can be achieved by modifying each of said control switch means to comprise two coupled control switch elements controlling two circuit portions, one of which goes to the corresponding blower motor and back to the electric power source, and the other of which goes through the main feeder motor and back to the electric power source, thus providing the full voltage available from the electric power source across each of the three motors. However, this arrangement is functionally equivalent to that described in greater detail hereinabove.

It is a further object of the present invention to provide apparatus of the character referred to hereinbefore, wherein said supply hopper means comprises a plurality of extension elements making it possible to modify the interior chamber capacity thereof as desired.

It is a further object of the present invention to provide apparatus of the character referred to hereinbefore, embodying any of the features referred to hereinbefore, either generic or specific, and either individually or in combination, and which is of relatively simple, inexpensive, foolproof, easy-to-operate construction such as to facilitate the manufacture, distribution, and use thereof.

Further objects are implicit in the detailed description which follows hereinafter (which is to be construed as exemplary only, and not as specifically limiting the invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying two sheets of drawings and is described in detail hereinafter.

FIG. 1 is a reduced-size perspective view, partially broken away and fragmentary with respect to both of the extension ducts and with respect to one of the paired set of nozzles carried at the outflow terminus of one of said broken-away extension ducts. Also, a portion of the hose adapted to feed the water spray nozzle and a portion of the input electric power supply lead are shown broken away. All of these broken-away portions are removed for reasons of drawing simplification and drawing space conservation.

FIG. 2 is a view taken in the direction of the arrows 2—2 of FIG. 1 and is partly a vertical sectional view and is partly a vertical elevational view. The extension ducts are not shown in this view. Also, removal of an exemplary blower (and motor) is shown in phantom.

FIG. 3 is an enlarged fragmentary sectional view taken in the direction of the arrows 3—3 of FIG. 2 and illustrates one of the controllably openable and closable air by-pass means for controlling the degree of suction applied to the finely divided material which is to be fed to a selected region.

Figure 5:
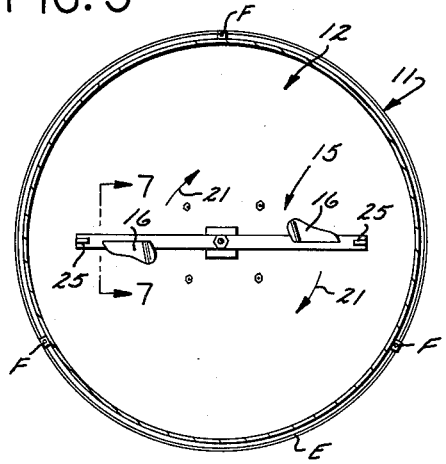
FIG. 5 is also a view as seen from above, but is taken immediately below the conical protective baffle and cover means as indicated by the arrows 5—5 of FIG. 2.
Figure 6:
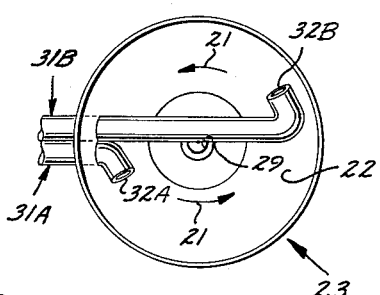
FIG. 6 is a view looking upward into the bottom of the conical protective baffle and cover means and is taken in the direction of the arrows 6—6 of FIG. 2.
Figure 7:
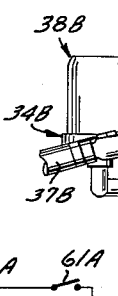

FIG. 7 is a view taken in the direction of the arrows 7—7 of FIG. 5 and illustrates the inclination or pitch of each of the two opposed portions of the pitched blade means of the rotor which is so inclined as to throw the finely divided material, which is to be fed, tangentially upwardly and also slightly outwardly for reception by the corresponding interior portions of the conical combination baffle and cover means shown in vertical section in FIG. 2 and in bottom plan view in FIG. 6.

Figure 8:
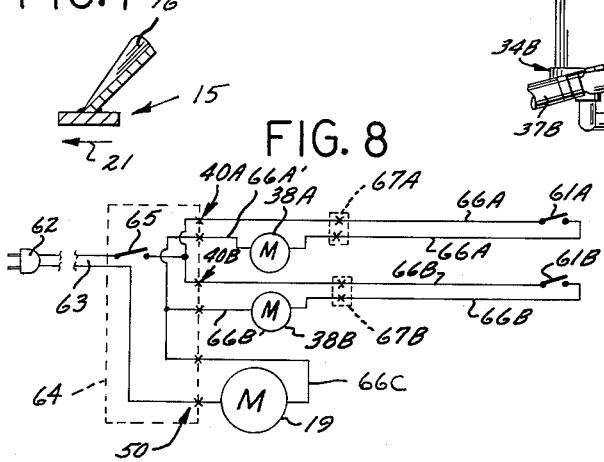

FIG. 8 is an electrical circuit schematic view of the exemplary form of the invention illustrated in FIGS. 1–7.

Figure 9:
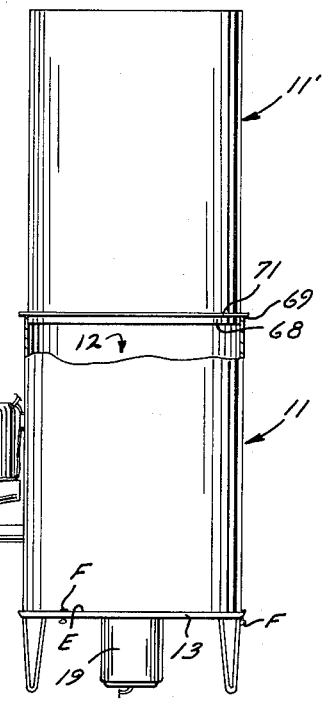

FIG. 9 is a side elevational view of the apparatus of FIG. 1 in the same orientation as FIG. 2, but with only the top portion of the supply hopper in section to show the receiving and mounting of a volume-amplifying vertically stackable and nestable hopper extension element, which greatly increases the over-all interior chamber capacity of the composite hopper means so produced.

FIG. 10 is a modified electrical circuit schematic view functionally equivalent to that shown in FIG. 8.

Referring to the figures for exemplary purposes, one illustrative embodiment of the invention is shown as comprising a supply hopper or reservoir means, indicated generally at 11 (which is shown as being of substantially cylindrical upstanding configuration, although not specifically so limited), which has an open top and, as indicated at 12, adapted to receive therethrough a quantity of finely divided material which is to be fed by the apparatus toward a selected region. Incidentally, in this connection, said finely divided material will be referred to hereinafter in one exemplary form thereof wherein it comprises a quantity of self-adhesive flock material. However, it should be noted that the invention is not specifically so limited and said description thereof is to be construed in this light throughout this application.

The supply hopper 11 has a removable bottom wall portion 13, removably fastened to the bottom edge E of the hopper 11 by a plurality of fasteners F, and effectively closing the bottom thereof and effectively carrying rotary agitating and feeding means, such as generally indicated at 14, which comprises rotor means, generally indicated at 15, having a pair of pitched blade means 16 rotatively mounted for rotation about a substantially vertical axis, indicated in broken lines at 17 in FIG. 2 and coincident with the output shaft 18 of the feeder motor means 19, which is positioned below the bottom wall 13 of the hopper means 11; said output shaft 18 drivingly coupling said feeder motor means 19 to said rotor means 15 for rotating same in a forward direction of rotation, such as is indicated by the direction of movement arrows designated by the reference numeral 21 in FIGS. 5, 6, and 7.

It should be noted that each of said pitched blade means 16 is inclined downwardly and forwardly and also in the form illustrated, slightly downwardly and radially outwardly with respect to said forward direction of rotary movement thereof, as indicated by the directional arrows 21 referred to above. This acts to throw the finely divided flock material M tangentially upwardly and also slightly outwardly in response to rotation of the rotor means 15 so as to be received within the inside conical chamber 22 defined within the protective substantially conical baffle and cover means, indicated generally at 23 and positioned within the hopper means 11 at a central location spaced directly above the rotor means 15 and with its open bottom 24 directly above said rotor means 15 for reception of said flock material M thrown tangentially upwardly and also outwardly by the pitched inclined blade means 16 of said rotor means 15 when it is rotated in said forward direction of rotation, indicated by the directional arrows 21, by the feeder motor means 19.

Figure 4:
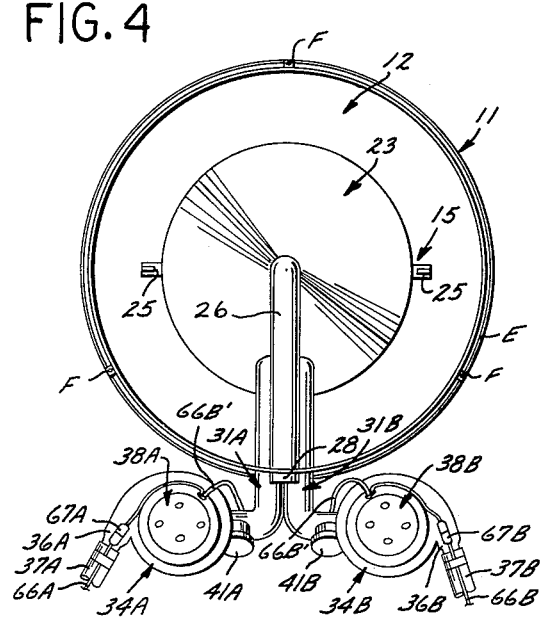
FIG. 4 is a top plan view of the apparatus, with each of the extension ducts broken away quite close to the corresponding air pumps or blowers of the pneumatic feed means.

It should be noted that the rotor means 15 is also provided with upwardly directed stirring and mixing means comprising the two upwardly directed stirring finger members 25 positioned radially outwardly of the protective baffle and cover means 23, as is best shown in FIG. 4, and adapted to extend upwardly for stirring and mixing any flock material M which may lie in the annular regions positioned thereabove and radially outwardly of the conical protective baffle and cover means 23. This will cause a peripheral downward feeding action of said finely divided flock material M outside of the conical baffle and cover means 23 toward the bottom wall 13 of the hopper means 11 so that it can be thrown upwardly by the pitched blades 16 of the rotor means 15 into the hollow interior chamber 22 within the conical baffle and cover means 23, where it can be picked up by suction of the pneumatic feed means (which will be described in greater detail hereinafter) and fed outwardly toward a point of utilization.

In the exemplary form of the invention illustrated, said pneumatic feed means referred to above comprises an air inflow duct means 26 which passes through the side wall of the reservoir means 11, as indicated at 27, where it is rigidly affixed to said reservoir means 11. The outer end of said air inflow duct 26 is open, as indicated at 28. Said air inflow duct means 26 has its other open end 29 rigidly affixed to the apex of the conical baffle and cover means 23 so as to supply inflow air into the top of the interior chamber 22 therein.

Said pneumatic feed means referred to above also comprises outflow duct means communicating with the hollow interior chamber 22 of said conical baffle and cover means 23 below the open end 29 of the inflow duct means 26 into said interior chamber 22. In the example illustrated, there are two such outflow duct means, indicated generally at 31A and 31B, each having an open inlet end, as indicated at 32A and 32B, respectively, positioned within the interior chamber 22 of the conical baffle and cover means 23 at locations displaced from each other by substantially 180 degrees (as is best shown in FIG. 6) and with each being directed in a substantially tangential manner having a tangential component similar to the tangential component of the finely divided flock material tangentially and upwardly thrown in the direction of the arrows 21 as a result of forward rotation of said rotor means 15 in the direction of the arrows 21. This will prevent any of said finely divided flock material M from being directly thrown into the open inlet ends 32A and 32B of said outflow duct means 31A and 31B so as to minimize any likelihood of the flow being impeded by a choking action.

Each of said outflow duct means 31A and 31B extends through the wall of the hopper means 11 and is rigidly affixed thereto as indicated at 33A and 33B, respectively, and then extends into the inlet side of a corresponding one of two air pump or blower means, indicated generally at 34A and 34B, respectively; said inlet sides being indicated at 35A and 35B, respectively. The outlet sides of each of said pumps or blowers 34A and 34B, as indicated at 36A and 36B, respectively, effectively comprise what might be termed air outflow duct terminus means adapted to be effectively extended by sealed engagement with respect to corresponding extension ducts, as indicated fragmentarily at 37A and 37B in FIGS. 1, 4, and 9. This will be described in greater detail hereinafter.

Each of said air pumps or blowers 34A and 34B of the exemplary form of the invention illustrated is shown as comprising a combination unit comprising a centrifugal type blower provided with, and driven by, electric motor means generally designated at 38A and 38B, respectively. The detailed interior structure of the combination electric motor means 38A and centrifugal blower means 34A, and of the other unit comprising the other electric motor means 38B and the other centrifugal blower means 34B, are not shown with any degree of particularity since such composite motor-centrifugal blower units are well known in the art.

It should be noted that the portion of each of the outflow duct means 31A and 31B, respectively, between the interior chamber 22 of the combination baffle and cover means 23 and the inlet side 35A and 35B, respectively, of the corresponding centrifugal blowers 34A and 34B, respectively, is provided with controllably openable and closable air by-pass means, indicated generally at 39A and 39B, respectively, and comprising cap members 41A and 41B, respectively, each having a downwardly directed threaded stem portion such as the exemplary one shown at 42A in FIG. 3, threadedly cooperable with a downwardly open, transverse, centrally threaded spider member, such as the one shown at 43A in FIG. 3, whereby to be threadedly movable upwardly and downwardly relative to the hollow tubular portion 44A (or 44B) thereof so as to effectively comprise controllably openable and closable by-pass valve means connected in parallel to the inlet portions 32A and 32B of said outflow duct means 31A and 31B, respectively, whereby to control the degree of effective suction and flock material feeding action available within the hollow interior chamber 22 of the conical protective baffle and cover means 23.

Each of the extension ducts shown fragmentarily at 37A and 37B in FIG. 1 may comprise a flexible hollow tube means, such as a rubber tube which may have its wall effectively stiffened by suitable coiled wire means, mesh means, or the like, if desired, although not specifically so limited, and which is adapted to extend to a remote terminus or end, such as the one shown at 45B in FIG. 1. Each of said remote ends, such as the one shown at 45B in FIG. 1, is there provided with a fitting, such as the one shown at 46B in FIG. 1, which couples a hose, such as the one shown at 37B in FIG. 1, to dissemination nozzle means, such as the one indicated generally at 47B in FIG. 1. Each of said dissemination nozzle means, such as the one shown at 47B in FIG. 1, includes a rigid portion, such as the portion shown at 48B in FIG. 1, and an apertured spray jet end, such as the one shown at 49B in FIG. 1, which is shown positioned closely adjacent to an apertured water spray jet nozzle end 51B in FIG. 1 and which is carried by a rigid tubing portion, such as the one shown at 52B in FIG. 1, and which is fastened by fastening strap means or other appropriate fastening means, such as shown at 53B in FIG. 1, to the rigid metallic handle portion 48B of the dissemination nozzle means, indicated generally at 47B in FIG. 1. This causes both the water spray nozzle means, indicated generally at 54B in FIG. 1, and the dissemination nozzle means, indicated generally at 47B in FIG. 1, to be rigidly fastened together for movement as a unit having the desired angularly converging forwardly directed relationships of the apertured emission jets or nozzle ends 49B and 51B so that emission of air and flock mixture from the nozzle end 49B will coincide with, and cause mixture thereof with, the water spray emitted from the water spray nozzle tip 51B so that the mixture of water, air and flock material can be sprayed toward a directed region, usually for application on a desired surface to which the flock material will adhere because of the adhesive action thereof as a result of the moistening thereof by the water spray.

It should be noted that the rear portion of the water spray nozzle means, indicated generally at 54B, is provided with a threaded fitting 55B which is adapted to be connected to the conventional end of a conventional garden hose, such as is indicated at 56B, the other end of which is adapted to be connected by a conventional fitting 57B to a water tap such as shown at 58B. This provides a supply of pressurized water for the water spray nozzle means 54B, and the flow of said pressurized water from the water spray nozzle tip 51B can be controlled by a finger or thumb operable valve means 59B which is normally spring biased into closed position, but which can be forcibly moved downwardly into open relationship by the application of digital pressure thereto when the entire paired set of nozzles 47B and 54B is held in an operator's hand.

Thus, an operator can readily control the emission of water from the water spray nozzle tip end 51B by merely applying his thumb to the valve member 59B and, as previously pointed out, he can control the feed of the flock material from the flock material dissemination nozzle tip end 49B by controlling the degree of opening of the by-pass valve means 39B. The operator can also cause energization and/or de-energization of the motor means 38B of the centrifugal blower or air pump 34B by operating the electric circuit switch means 61B, which is also carried by the paired set of nozzle means 47B and 54B. In this connection, it should be noted that whenever said switch means 61B is moved to closed position, the electric motor 38B of the corresponding centrifugal blower means 34B is energized and causes operation of said centrifugal blower means 34B and this always occurs along with energization of the main agitator and feeder motor means 19 so that it is always operating whenever either one of the electric motors 38A or 38B of the two centrifugal blower means 34A and 34B, respectively, is energized.

The above is accomplished by reason of the electric circuit arrangement best shown in electrical schematic form in FIG. 8, wherein an electrical plug 62 is illustrated and is adapted to be connected to a suitable source of electric power, such as the 110–120 volt alternating current electric power conventionally available in most buildings and structures in the United States of America, although the invention is not specifically limited to any particular type of electric power nor to any particular mode of connection thereto. The two-wire electrical cord from the plug 62 is indicated by the reference numeral 63 and extends into an electrical connection box 64 which is provided with a manually operable switch 65 for effectively opening and closing the circuit.

The electric circuit shown in FIG. 8 includes a first circuit portion 66A provided with a first remote control switch 61A similar to the one previously described as being carried by the paired nozzle set 47B and 54B in FIG. 1, but adapted to be carried by the other paired nozzle set adapted to be carried at the end of the other extension duct 37A (not shown in FIG. 1). Said first remote control switch means 61A is connected in series with the first electric motor 38A coupled to the first centrifugal blower means 34A.

It should be noted that the schematic of FIG. 8 also shows a second electric circuit portion 66B provided with a second remote control switch means comprising the previously described switch 61B clearly shown in FIG. 1 as being carried by the right paired nozzle set 47B and 54B. Said second remote control switch means 61B is connected in series with the second electric motor 38B which drives the second centrifugal blower means 34B.

It will be noted that the parts of the first and second electric circuit portions 66A and 66B which are connected to the remote first and second control switch means 61A and 61B, respectively, are provided with electrical connector means 67A and 67B, respectively, for making it possible to disconnect either of the extension ducts 37A or 37B from the fittings shown at 36A and 36B, respectively, at the outlet sides of the corresponding centrifugal blowers 34A and 34B, respectively, while at the same time disconnecting the parts of the first and second electric circuit portions 66A and 66B which are physically mounted alongside of and carried by the corresponding extension ducts 37A and 37B, respectively.

It should also be noted that the electric circuit shown in FIG. 8 includes a third electric circuit portion 66C connected in series with the feeder and agitator electric motor 19 and connected in series with each of said first and second circuit portions 66A and 66B, which are connected in parallel with each other, thus providing an arrangement such that closure of either of the remote control switches 61A or 61B, when the main switch 65 is closed, will cause energization of the corresponding centrifugal blower motor 38A or 38B and at the same time will cause energization of the feeder and agitator motor 19. This is true irrespective of whether either of said remote control switches 61A and 61B is closed or whether both of them are closed.

Thus, two operators can perform independent flocking operations, completely under individual control at the corresponding paired nozzle set, such as the one shown at 47B and 54B in FIG. 1, and either operator can stop his particular flocking operation by releasing the corresponding water valve, such as the one shown at 59B, and by turning the corresponding remote control switch 61B or 61A to off position. This will completely stop the emission of both water and the air-flock mix from his paired nozzle set, but will not interfere with the operation of the other paired nozzle set.

It should be noted that, in addition to selective removal of each of the two extension ducts 37A and/or 37B as described above, the apparatus is also arranged to allow selective removal of either or both of the centrifugal blowers 34A or 34B and corresponding driving electric motors 38A and 38B if desired. This may allow them to be used elsewhere. This is made possible by reason of the fact that each of the blowers has a downwardly directed pipe, such as is shown at 20A and 20B, respectively, which is adapted to merely be downwardly slipped over the corresponding upwardly directed connection portions 30A or 30B, respectively, of the corresponding duct means 31A and 31B, respectively. The arrangement is such as to provide a sealed connection, but one which can be mechanically disconnected by merely lifting either of the compressors and motors off of said upwardly directed connection pipe portions 30A or 30B, respectively.

It should also be noted that the first and second circuit portions 66A and 66B include the input circuit parts 66A' and 66B' which extend from the electric motors 38A and 38B, respectively, to the two electrical connector plug junctions generally designated at 40A and 40B, respectively. This makes it possible to electrically disconnect said input circuit parts 66A' and/or 66B' from the electrical connector box 64 when either of said compressors and motors is removed from the apparatus as mentioned above. Also for convenience, the circuit portion 66C to the main feeder motor 19 includes an additional electrical connector junction means, indicated generally at 50, adapted to facilitate the removal of the entire bottom wall 13 (which carries said motor 19) from the remainder of the hopper means 11 when desired, such as for repairing the motor, the rotor or the like.

It should be noted that the left extension duct 37A, shown broken away in FIG. 1, is provided with the same type of elements as shown at the end of the right extension duct 37B illustrated in FIG. 1. The electrical elements of both of said extension ducts and the paired nozzle sets at the outer ends thereof are shown in electrical schematic form in FIG. 8.

The hopper means 11 may be used in the form best shown in FIGS. 1 and 2 or may be effectively enlarged by comprising a plurality of vertically stackable and nestable extension elements, such as the one generally designated at 11' in FIG. 9, which is effectively stacked upon the open upper end 12 of the main lowermost hopper means 11 whereby to effectively enlarge or increase the interior chamber capacity of the composite hopper means. This may be done to any desired degree by merely adding on and vertically stacking additional hopper extension elements similar to the one shown at 11' in FIG. 9.

In the exemplary form illustrated, the vertical stacking of the additional hopper extension elements, such as the one shown at 11', is provided by reason of the fact that each of said extension hopper elements 11' has a bottom edge 68 slightly smaller in diameter than the top edge 69 of the main bottom hopper means 11 and, therefore, is insertable thereinto in a manner such as to cause the radially outwardly directed flange or lip 71 of the hopper extension element 11' to rest upon said top edge 69 of the bottom or main hopper means or element 11. This provides a firm and solid connection of the vertically stacked hopper elements 11 and 11' in the manner clearly shown in FIG. 9. However, this is one exemplary arrangement only, and it should be noted that the invention is not specifically limited to this particular kind of hopper enlargement, but may include various other functionally equivalent structures for providing modification of the size of the hopper means.

It should be noted that the extension ducts 37A and 37B may be connectable to the outlet terminus portions 36A and 36B of the centrifugal blowers 34A and 34B, respectively, by merely a slipover engagement or may be provided with any type of coupling means desired for this purpose and adapted to provide an effectively sealed connection therebetween.

It should be clearly understood that the electric circuit arrangement of the first form of the invention, as most clearly shown in electrical schematic form in FIG. 8, is not to be construed as specifically limiting the invention to this particular arrangement and connection of the various elements thereof. Actually, there are various functional equivalents to that shown in FIG. 8 which will cause simultaneous operation of either of the blower motor means and the main feeder motor, and an exemplary one of such arrangements is illustrated in fragmentary electrical schematic form in FIG. 10.

It should be noted that, in the modification illustrated in FIG. 10, all of the electrical connector plugs such as the five shown at 40A, 40B, 50, 67A, and 67B in FIG. 8, are eliminated for reasons of drawing simplification. However, they may be connected in the circuit in a substantially corresponding manner in accordance with the implications of the teachings of FIG. 8, if desired, and FIG. 10 is to be so construed.

In the modified electrical schematic illustrated in FIG. 10 it will be noted that all parts corresponding to those of FIG. 8 are indicated by the same reference character, followed by the letter "a," however, and it will be noted that each remote control switch 61A*a* and 61B*b* has coupled thereto an extra control switch element such as shown at 61A*a*' and 61B*a*', respectively, which bypasses the corresponding blower motor 38A*a* and 38B*a*, respectively, and is connected to one side of the main feeder motor 19*a*, which has the other side connected to one of the input lead wires 63*a*. It should also be noted that the left side of each of the blower motors 38A*a* and 38B*a*, as shown in FIG. 10, are connected directly to the same one of said input leads 63*a* as the left side of the main feeder motor 19*a*.

In other words, the modified arrangement illustrated in FIG. 10 is still such that closure of the pair of coupled remote control switch means 61A*a* and 61A*a*' will energize the blower motor 38A*a* and will simultaneously energize the main feeder motor 19*a*, while closure of the other pair of coupled remote control switch means 61B*a* and 61B*a*' will energize the other blower motor 38B*a* and will simultaneously energize the main feeder motor 19*a*.

Thus, it can be seen that the modified arrangement illustrated in electrical schematic form in FIG. 10 is the full functional equivalent of the arrangement illustrated in electrical schematic form in FIG. 8—the only difference being that the full supply source voltage is applied across each of the three motors which are connected in parallel in FIG. 10, while in FIG. 8 said supply source voltage is divided between either one of the blower motors and the main feeder motor, which are connected in series, or between both of the blower motors, which are connected in parallel, and the main feeder motor which is in series therewith.

Furthermore, it should be noted that various other electric circuit arrangements may also be employed within the broad scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Flocking apparatus comprising: supply hopper means adapted to receive therein a quantity of finely divided particulate material which is to be fed toward a selected region; rotary agitating and feeding means positioned within said hopper means above the bottom thereof and comprising rotor means having at least one pitched blade means rotatively mounted for rotation about a substantially vertical axis, said pitched blade means being inclined downwardly and forwardly with respect to a forward direction of rotary movement thereof whereby to throw said finely divided particulate material tangentially upwardly in response to forward rotation of said rotor means; feeder motor means drivingly coupled to said rotor means for rotating same in said forward direction of rotation when energized; protective baffle and cover means positioned within said hopper means and spaced above said rotor means and having an open bottom directly vertically above said rotor means for the reception of the finely divided particulate material thrown tangentially upwardly by said rotor means when rotated in said forward direction of rotation by said motor means; and pneumatic feed means comprising air inflow duct means into the interior of said protective baffle and cover means and outflow duct means communicating with the interior of said protective baffle and cover means below said air inflow duct means and in inner peripheral regions thereof into which said finely divided particulate material is tangentially upwardly thrown in response to forward rotation of said rotor means, said outflow duct means having an open inlet end means directed in substantially the same direction as said forward direction of rotation of said rotor means, said outflow duct means having an outflow terminus and being provided with pump means and pump motor means for rotating same when energized whereby to effectively suck a mixture of air and said finely divided particulate material from the interior of said protective baffle and cover means through said outflow duct means to said outflow terminus thereof.

2. Apparatus as defined in claim 1, wherein said rotor means is provided with stirring means positioned radially outwardly of the protective baffle and cover means for stirring the finely divided particulate material and causing the gravity downward feeding thereof to fill the volume previously occupied by said material thrown tangentially upwardly by said forward rotation of said rotor means.

3. Apparatus as defined in claim 1, wherein said feeder motor means comprises an electric motor and said pump motor means comprises an electric motor provided with an electric circuit having a remote control switch means connected in series with said pump electric motor and connected in series with said feeder electric motor, whereby closure of said remote control switch means, when said electric circuit is electrically connected to a suitable source of electrical power, will cause energization of both of said electric motors and rotation of said rotor means of said rotary agitating and feeding means and operation of said pump means.

4. Apparatus as defined in claim 1, wherein said hopper means comprises a plurality of vertically stackable and nestable extension elements making it possible to modify the interior chamber capacity of said hopper means as desired.

5. Flocking apparatus for applying a finely divided, particulate, self-adhesive flock material to a surface, comprising: supply hopper means of substantially cylindrical upstanding configuration having an open top and adapted to receive therethrough a quantity of said self-adhesive flock material; rotary agitating and feeding means positioned within said hopper means above and substantially at the center of the bottom thereof and comprising rotor means having multiple pitched blade means rotatively mounted for rotation about a substantially vertical axis substantially coaxial with the center of said cylindrical hopper means, said pitched blade means being inclined downwardly and forwardly and slightly downwardly and radially outwardly with respect to a forward direction of rotary movement thereof whereby to throw said flock material tangentially upwardly and also outwardly in response to forward rotation of said rotor means; feeder electric motor means positioned below the bottom of said hopper means and drivingly coupled to said rotor means for rotating same in said forward direction of rotation when energized; protective substantially conical baffle and cover means positioned within said hopper means and spaced above said rotor means and having an open bottom directly vertically above said rotor means for the reception of the flock material thrown tangentially upwardly and also outwardly by said rotor means when rotated in said forward direction of rotation by said motor means; and pneumatic feed means comprising an air inflow duct means into the interior of said protective baffle and cover means adjacent to the top thereof and outflow duct means communicating with inner peripheral regions of the interior of said protective baffle and cover means below said air inflow duct means and effectively comprising receiving regions into which said flock material is tangentially upwardly and also outwardly thrown in response to forward rotation of said rotor means, said outflow duct means comprising a pair of outflow ducts having open inlet end means displaced from each other by substantially 180 degrees and each directed in a tangential manner having a tangential component similar to the forward direction of rotation of said rotor means and to a corresponding tangential component of said flock material tangentially and upwardly and also outwardly thrown by said forward rotation of said rotor means, each of said two outflow ducts having a remote outflow terminus and each being provided with centrifugal blower pump means and electric motor means for rotating same when energized whereby to effectively suck a mixture of air and said flock material from the interior of the corresponding 180 degrees displaced open inlet end means of said outflow ducts within said combination protective baffle and cover means through the corresponding outflow duct to the corresponding outflow terminus thereof.

6. Apparatus as defined in claim 5, wherein said rotor means is provided with upwardly directed stirring means positioned radially outwardly of the protective baffle and cover means for stirring the flock material and causing the gravity downward feeding thereof to fill the volume previously occupied by said flock material thrown tangentially upwardly and also outwardly by said forward rotation of said rotor means.

7. Apparatus as defined in claim 5, including a pair of extension ducts and means for sealingly connecting them at inner ends thereof with respect to said first and second outflow duct terminuses and each being provided at outer ends thereof with dissemination nozzle means and closely adjacent water spray nozzle means convergingly directed for causing convergence of water spray and flock and air mixture as they are forcibly ejected from the corresponding nozzle means.

8. Apparatus as defined in claim 5, including: a first electric circuit portion provided with a first remote control switch means connected in series with the electric motor means rotating a first one of said two centrifugal blower pump means; a second electric circuit portion provided with a second remote control switch means connected in series with said electric motor means rotating a second one of said two centrifugal blower pump means; and a third electric circuit portion connected in series with the electric motor rotating said agitating and feeding rotor means, said first and second electric circuit portions being connected in parallel with respect to each other and each being connected in series with respect to said third electric circuit portion whereby closure of either of said first or second electric switches will cause rotation of the corresponding one of said centrifugal blower pump means and also will cause simultaneous rotation of said agitating and feeding rotor means.

9. Apparatus as defined in claim 8, including a pair of extension ducts and means for sealingly connecting them at inner ends thereof with respect to said first and second outflow duct terminuses and each being provided at outer ends thereof with dissemination nozzle means and with closely adjacent water spray nozzle means convergingly directed for causing convergence of water spray and flock and air mixture as they are forcibly ejected from the corresponding nozzle means.

10. Apparatus as defined in claim 9, wherein said first remote control switch means is carried adjacent to the corresponding dissemination nozzle means and water spray nozzle means and said second remote control switch means is carried adjacent to the other dissemination nozzle means and water spray nozzle means for remote operation of the corresponding centrifugal blower pump means and the agitating and feeding rotor means.

11. Apparatus as defined in claim 5, wherein said hopper means comprises a plurality of vertically stackable and nestable extension elements making it possible to modify the interior chamber capacity of said hopper means as desired.

12. Apparatus as defined in claim 5, including: a first electric circuit portion provided with a first remote control switch means connected in series with the electric motor means rotating a first one of said two centrifugal blower pump means; a second electric circuit portion provided with a second remote control switch means connected in series with said electric motor means rotating a second one of said two centrifugal blower pump means; and a third electric circuit portion connected in series with the electric motor rotating said agitating and feeding rotor means, said first, second and third electric circuit portions being connected with respect to each other and with respect to said remote control switch means and adapted to be connected to a suitable electric power supply means in a manner such that closure of either of said first or second electric switch means will cause operation of the corresponding one of said pump means and will also cause simultaneous rotation of said agitating and feeding rotor means.

13. Apparatus as defined in claim 5, including: a first electric circuit portion provided with a first remote control switch means connected in series with the electric motor means rotating a first one of said two centrifugal blower pump means; a second electric circuit portion provided with a second remote control switch means connected in series with said electric motor means rotating a second one of said two centrifugal blower pump means; and a third electric circuit portion connected in series with the electric motor rotating said agitating and feeding rotor means, said first, second and third electric circuit portions being connected in parallel with respect to each other and said third electric circuit portion being provided with parallel portions, each having therein an auxiliary remote control switch element effectively operable in response to operation of the corresponding one of said first and second remote control switch means, whereby closure of either of said first or second remote control switch means will cause rotation of the corresponding one of said centrifugal blower pump means and will also cause simultaneous rotation of said agitating and feeding rotor means.

No references cited.

M. HENSON WOOD, Jr., *Primary Examiner*.

R. S. STROBEL, *Assistant Examiner*.